(12) United States Patent
Guy et al.

(10) Patent No.: US 7,005,065 B1
(45) Date of Patent: Feb. 28, 2006

(54) WASTEWATER TREATMENT SYSTEM HAVING AERATION DROPLINE-SUPPORTING CLIPS

(75) Inventors: Wayne Guy, Baton Rouge, LA (US); Michael D. Catanzaro, Baton Rouge, LA (US); Raleigh Lee Cox, Baton Rouge, LA (US); Christopher Edward Cox, Denham Springs, LA (US)

(73) Assignee: Pentair Pump Group, Inc., Golden Valley, MN (US)

( * ) Notice: Subject to any disclaimer, the term of this patent is extended or adjusted under 35 U.S.C. 154(b) by 0 days.

(21) Appl. No.: 10/981,246

(22) Filed: Nov. 4, 2004

(51) Int. Cl.
*C02F 3/20* (2006.01)

(52) U.S. Cl. .................. 210/195.4; 210/197; 210/220; 210/256; 210/541

(58) Field of Classification Search ............. 210/195.4, 210/197, 220, 256, 541
See application file for complete search history.

(56) References Cited

U.S. PATENT DOCUMENTS

| | | | |
|---|---|---|---|
| 1,066,706 A | 7/1913 | Caine | |
| 2,638,643 A | 5/1953 | Olson | |
| 3,189,305 A | 6/1965 | Willenborg | |
| 3,363,864 A | 1/1968 | Olgree | |
| 4,009,106 A | 2/1977 | Smith | |
| 4,408,742 A | 10/1983 | Korb | |
| 4,572,695 A | 2/1986 | Gilb | |
| 4,650,577 A | 3/1987 | Hansel | |
| 4,700,737 A | 10/1987 | Nelson | |
| 4,983,285 A | 1/1991 | Nolen | |
| 5,221,470 A | 6/1993 | McKinney | |
| 5,490,935 A | 2/1996 | Guy | |
| 5,879,550 A | 3/1999 | Cox | |

*Primary Examiner*—Chester T. Barry
(74) *Attorney, Agent, or Firm*—Jones, Walker, Waechter, Poitevent, Carrere & Denegre, L.L.P.

(57) ABSTRACT

A clip for supporting the clarifier and the droplines in a wastewater treatment system is disclosed. The clip comprises a pair of parallel main plates wherein at least one main plate contains a groove. The main plates are separated by a bracing plate. The bracing plate is perpendicular to the main plates and is attached to the ends of each. Attached to the free ends of each of the main plates is a pair of mounting plates. These mounting plates are parallel to the bracing plate. In a preferred embodiment, the grooves are "V" shaped and each contains a hole. This pair of holes are vertically aligned, and each hole is sized to contain a dropline.

9 Claims, 6 Drawing Sheets

7A

7B

WASTEWATER TREATMENT SYSTEM HAVING AERATION DROPLINE-SUPPORTING CLIPS

BACKGROUND OF THE INVENTION

The invention relates generally to clips used in wastewater treatment tanks, such as that disclosed in U.S. Pat. No. 5,490,935, shown in FIG. 1, having a central conical clarifier 100 and a plurality of droplines 102 encircling the clarifier. In such systems, air is generally pumped through the droplines and into the wastewater in the tank in order to foster the growth of aerobic bacteria.

The conical clarifier 100 usually has a lip 104 at its upper edge. This lip 104 rests on a series of brackets 105 placed on the tank walls. A typical bracket used is an "L" shaped bracket. One leg of the "L" attaches to the tank walls so that the other plate extends perpendicularly from the walls. The clarifier lip 104 rests on the plate of the "L" bracket that extends from the wall.

The droplines 102 in such a system generally extend downwardly from a circular distribution manifold, although other configurations are used, and the manifold is connected to an air source. The entire air distribution system is frequently comprised of ½ to ¾ inch PVC pipe. The droplines 102 are generally pipes with one or more openings near the end of the pipe distal from the distribution manifold. The air distribution manifold is supported by the "L" bracket. Each "L" bracket contains a hole which is sized to fit a dropline, so that the droplines extend down through an "L" bracket to near the bottom of the tank.

Pumping air through the droplines causes them to oscillate. Oscillations can cause damage to the droplines, particularly near the fittings which connect the droplines to the distribution manifold. The oscillations can be reduced by having the distal end of the drop tubes supported against the tank wall with brackets or retainers 150. However, these brackets are located in the fluid filled volume of the treatment tank and if the through-the-wall attachment fixtures are used, leakage through the bracket attachment points can be a problem. To avoid leakage, the retainer 150 can be welded or "glued" to the inner tank wall. However, welding the retainer to the tank wall can also create a weak spot in the tank wall which can potentially lead to a leak. If adhesives are used to attach the fitting to the tank wall, there is a risk that, over time, the adhesive will give way and become ineffective, potentially resulting in damage to the system.

U.S. Pat. No. 5,879,550 (incorporated by reference) discloses a wastewater treatment clip designed to reduce the amount of oscillation to the droplines. That clip consists of generally a "U" shaped bracket having two parallel main plates separated by a bracing plate. The two parallel main plates each contain an opening sized to accommodate a dropline. The clip attaches either to the inside wall of the wastewater treatment tank or hangs on the upper lip of the tank. In either instance, the clip attaches above the waterline and thus avoids potential problems associated with puncturing the tank wall below the waterline. In use, the distribution manifold rests on the upper parallel main plate of the "U" bracket and a dropline extends downwardly from the manifold through the twin openings in the "U" bracket. The two parallel main plates of the "U" bracket provide additional support for the droplines and assist in controlling the oscillations of the droplines.

Experience has shown that the "U" shaped clip reduces oscillations. However, the droplines undergo stress near the holes in the "U" shaped clip, and the problem is aggravated when the wastewater treatment tank or its aeration system becomes unleveled or tilted. In this instance, the dropline air discharge openings are not level and air passing through the manifold to the droplines will have a tendency to preferentially discharge through the dropline which is "higher" (closer to the ground surface) than the other drop lines. As a result, a larger volume of air migrates through the higher dropline, and causes increased vibration and oscillation for this high dropline. This increased oscillation and vibration often results in cracks, fractures, and breaks in the droplines at the location of the holes in the parallel main plates and at the point of connection between the droplines and the circular feeder.

OBJECTS OF THE INVENTION

It is an object of the invention to provide a clip for supporting the clarifier in a wastewater treatment system.

It is another object of the invention to provide a clip for supporting the droplines and the feeder in a wastewater treatment system.

It is another object of the invention to prevent the droplines from oscillating.

It is yet another object of the invention to reduce the likelihood that the wastewater system will leak.

SUMMARY OF THE INVENTION

A clip for supporting the clarifier and the droplines in a wastewater treatment system is disclosed. The clip comprises a generally "U" shaped bracket having a pair of parallel main plates separated by a bracing plate. Each main plate contains a dropline opening sized to accommodate a dropline. One or both main plates have a groove adapted to accommodate a fitting attached to the dropline.

DETAILED WRITTEN DESCRIPTION

Figure 1:
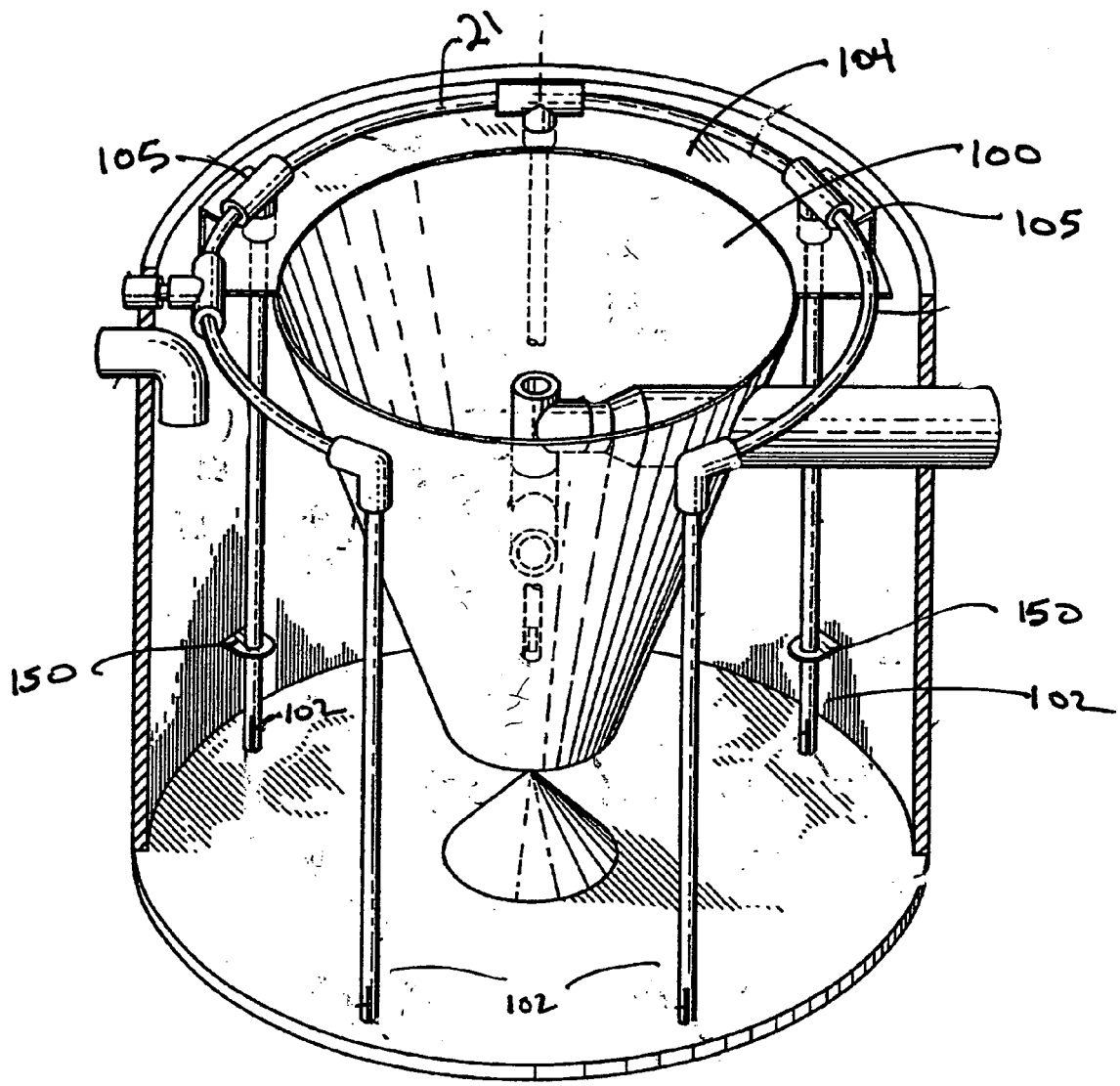
FIG. 1 is a schematic of a wastewater treatment system showing placement of prior art clips.
Figure 2:
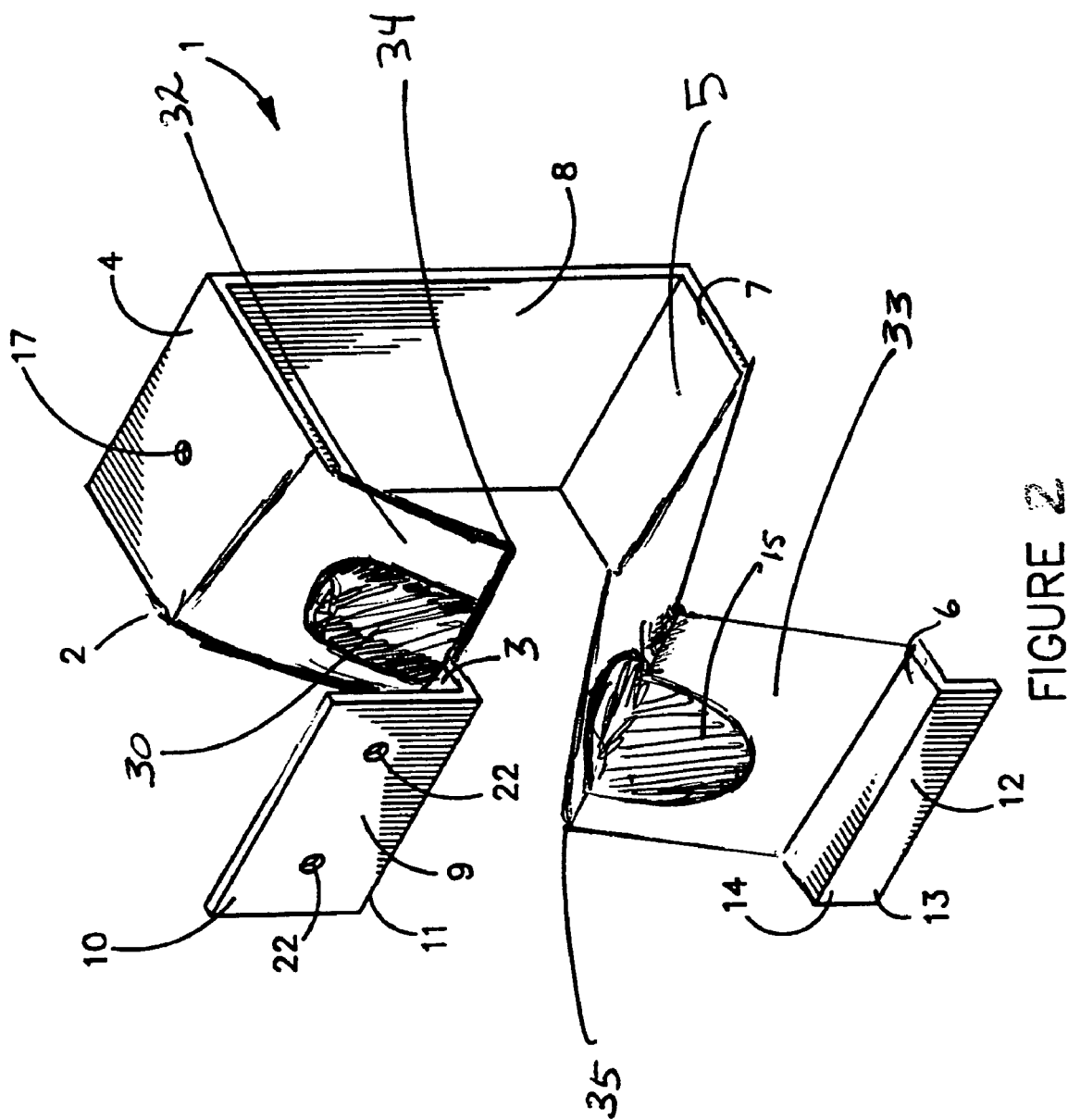
FIG. 2 is a perspective view of one embodiment of the improved clip.

FIG. 2 depicts a clip 1. As shown, clip 1 is generally "U" or arch shaped, with upper main plate 2, lower main plate and a bracing plate 8 joining the upper and lower main plates 5. Clip 1 is constructed of non-corrosive metal, such as stainless steel or aluminum, or inert materials, such as rigid plastics. Upper and lower main plates 2 and 5 each have "V" shaped grooves or notches 32 and 33 positioned across each plate respectively, where the grooves are vertically aligned but in an opposing relationship. Upper main plate 2 and lower main plate 5 are substantially parallel. Bracing plate 8 joins the two main plates 2 and 5 at the outer ends 4 and 7 of each main plate, respectfully.

Clip 1 also has an upper mounting plate 9 attached to the tank end 3 of upper main plate 2, and a lower mounting plate 12 attached to tank end 6 of lower main plate 5. Both mounting plates are positioned on the ends of the main plates and orientated to rest against the tank walls when installed. When installed, the upper mounting plate 9 may be bolted, riveted or otherwise attached to the tank wall above the water line without creating a potential leak. The lower mounting plate 12 will rest against the tank wall, and may be fixedly attached to the wall if desired (provided the mounting plate is located above the water level); however, the lower mounting plate need not be attached.

The top of the upper main plate 2 near the outer end 4 will support the lip of the clarifier. The clarifier lip may be bolted or otherwise fixedly attached to the upper main plate 2. The air distribution manifold will rest on the upper main plate 2 either between the lip of the clarifier and the tank wall or on top of the lip. In one preferred embodiment, the manifold will rest in the grooves 32 of the upper main plate 2.

The dropline openings in the main plates are sized to closely fit the droplines. In some embodiments, the droplines will contain thicker joints and reinforced areas with wider diameters at the location of the dropline opening, to reinforce this area of the dropline. However, the size of the dropline openings in the upper main plate and in the lower main plate can be different.

The main plates support and guide the droplines and damp oscillations. The distance which separates the main plates (the length of the bracing plate 8) will depend upon the length and flexibility of the droplines and the pressure of the air pumped through the lines. The greater the separation, the more rigid each dropline will become. A 5.5 inch separation works well in a system having three to eight ¾ inch schedule 40 PVC droplines, each length of about five feet, where air is injected at about 1.5 to 3 p.s.i.

Figure 3:
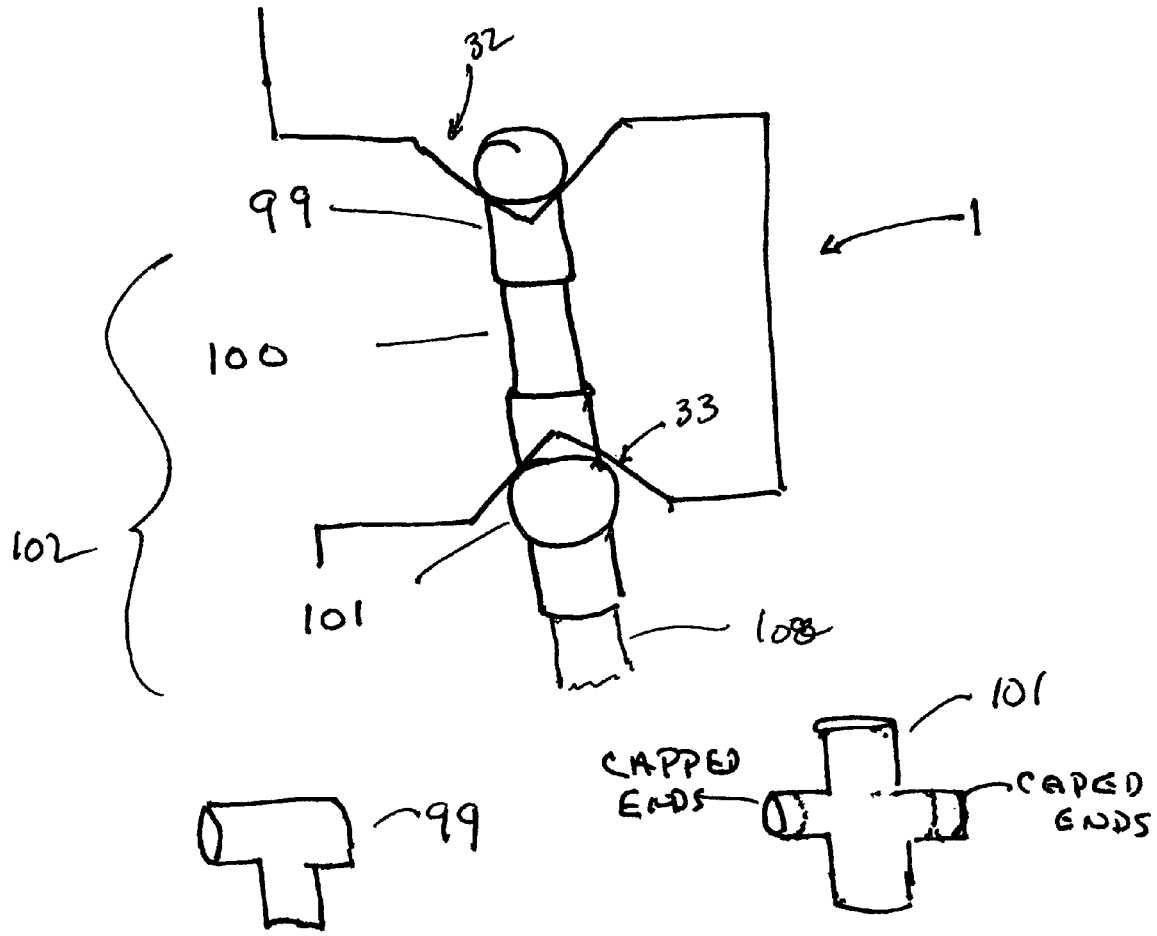
FIG. 3 is a side view of the clip in FIG. 2 showing the dropline connections.

Upper main plate 2 contains a first dropline opening 30 located in the groove 32 and lower main plate 5 contains a second dropline opening 15 located in the groove 33. First and second dropline openings 30 and 15 are sized to receive droplines 102, as depicted in FIG. 3, and are substantially aligned.

Figure 4:
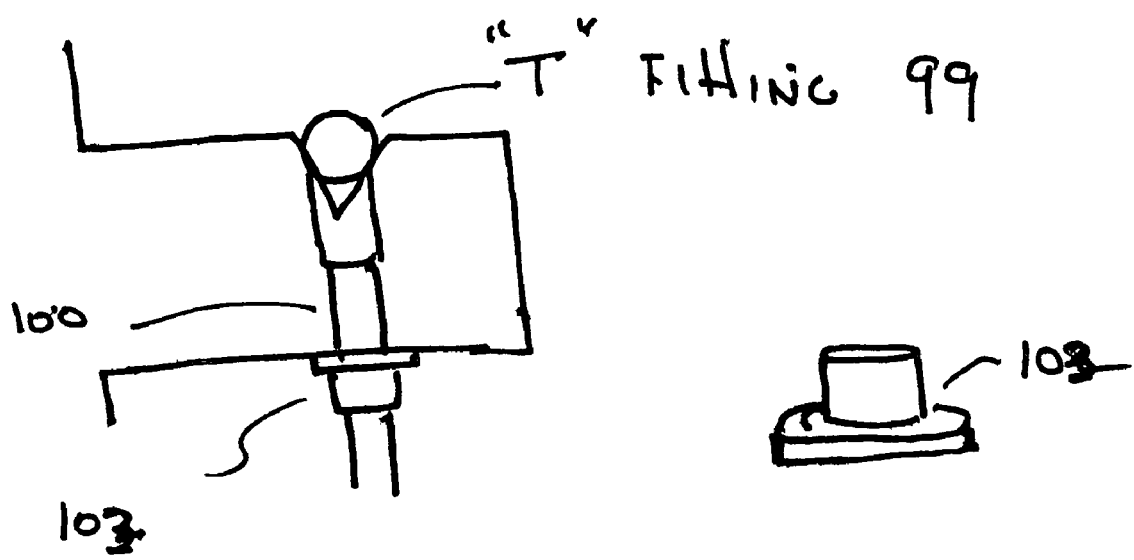
FIG. 4 is a side view of another embodiment of the improved clip showing the dropline connections

Upper groove 32 is adapted to accommodate and support the distribution manifold pipe 21. Groove shapes other than a "V" will accommodate the distribution pipe, such as "U" rectangular or arch shaped, are adapted to accommodate the distribution pipe or a dropline fixture. A "dropline fixture" is defined as any structure which is attached to (or a part of) the dropline and protrudes or thickens the dropline 16 near the area of the lower groove 33 or opening 15 in the lower main plate 5. One suitable fixture is a "cross" or "x" pipe joint with the closed horizontal ends, as shown in FIG. 3, or a "T" shaped pipe joint (used to connect the dropline to the air distribution pipe), also shown in FIG. 3. Additionally, a threaded flange body 103 attached to the dropline can be used, particularly if no lower groove is included on lower main plate, as depicted in FIG. 4. When a groove is provided in the lower main plate, the grove can be shaped comparable to that of the upper groove, such as "V", "U " and rectangle shaped grooves.

As shown in FIG. 2, upper main plate 2 includes a hole 17 near inner end 4 that can be used to secure the clip to the lip 18 of clarifier 19, using a bolt, screw, rivet or other joining means through hole 17. Additional holes may be provided if desired. Also shown are holes 22 in upper mounting plate 9 that can be used to secure the clip 1 to tank walls 23 using bolts or screw and holes 22. Holes 22 should be sized to fit the appropriate attachment hardware.

Upper main plate 2 may have a means for receiving tying instruments 20 such as cable ties 31, cord or wire. This means for receiving tying instruments 20 may include rings, loops, hooks or eyelets attached to upper main plate 2 or holes in upper main plate 2. These tying instruments may be used to secure the air distribution manifold 21 to the upper main plate 2.

Figure 5:
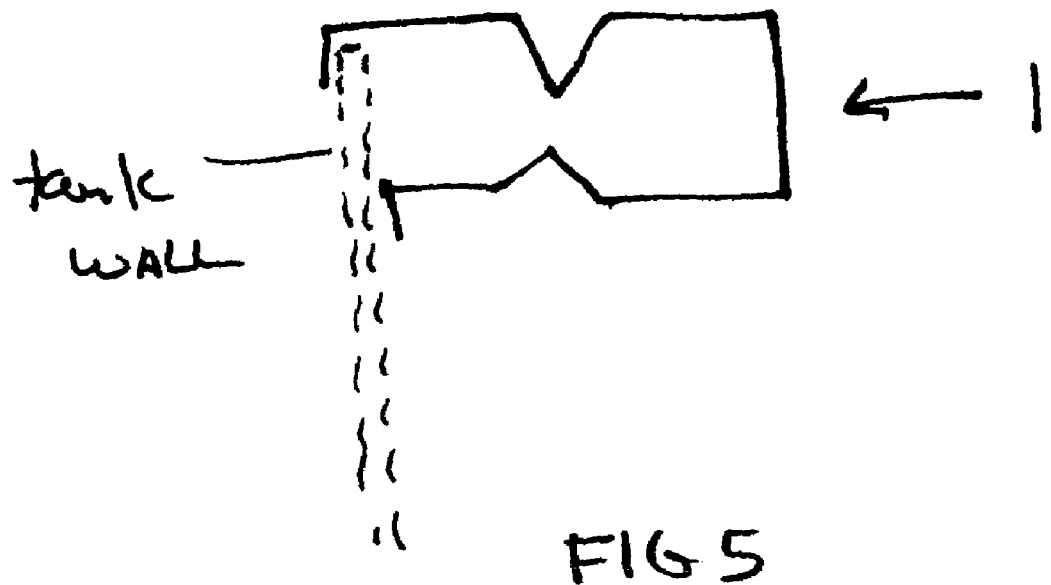
FIG. 5 is a side view of another embodiment of the improved clip.
Figure 6:
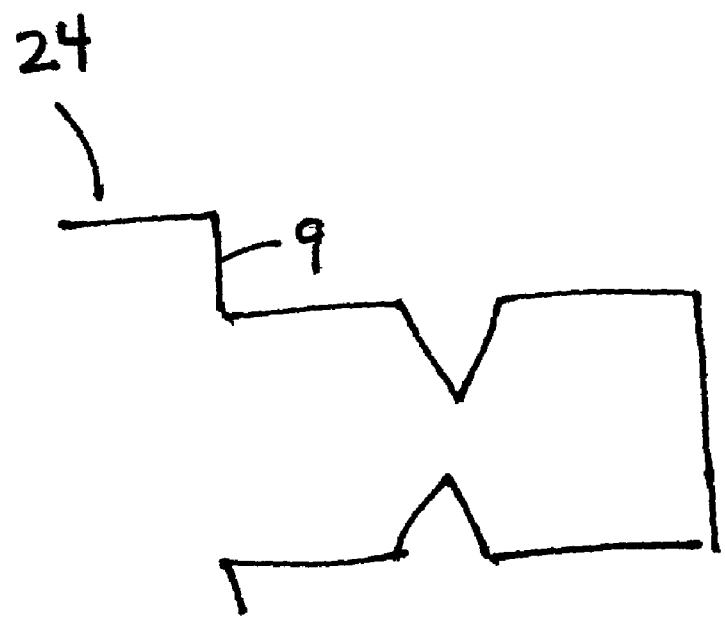
FIG. 6 is a side view of another embodiment of the improved clip.

In another preferred embodiment, clip 1 lacks the upper mounting plated 9. Instead, the upper mounting plate would be longer than the lower mounting plate to extend across the top of the tank and terminate in a downwardly positioned attachment flange section to be attached to the tank. See FIG. 5. Another embodiment includes a flange section attached to the upper mounting plate 9 terminal end, at right angles to the upper mounting section, as shown in FIG. 6. In this embodiment, the flange section 24 will rest on top of tank walls. The tank top wall is supported by the tank walls and will hold the flange section 24 in place. Flange section 24 may contain one or more holes 28 to facilitate attachment.

When the air system is constructed of PVC piping, assembling the clip 1 to the tank is as follows. Clips 1 will be attached to tank walls 23, such as by bolting through holes 22 in upper mounting plate 9, above the water level in the tank. A clip 1 should be installed at each dropline location. Air distribution manifold 21 will be positioned in the tank and supported in the groove 32 on the upper main plate of each installed clip 1. The air distribution manifold 21 has a "T" PVC fitting 99 installed at each clip 1 location, where the downward leg of the "T" is inserted through the opening 30 in the upper main plate 2 of each clip 1, as shown in FIG. 3, while the horizontal arms of the "T" shaped joint sit in first groove 32 of upper main plate 2. The sidewalls of first groove 32 cradle circular feeder 21 and reduce movement of circular feeder 21 caused by vibration.

A short section 100 of PVC pipe is then welded to the downward leg of the "T" fitting, forming the top of a dropline 102. The bottom end of this short pipe section 100 should slightly protrude through the opening 15 in the lower main plate 5. An "X" or cross fitting 101 is then welded on to the protruding end of the short pipe section 100. The horizontal arms of the "X" shaped joint form the dropline fixture and the ends of the horizontal arms of this fitting are capped to avoid air discharge through the cross appendages. The length of the short pipe section is established so that the "X" fitting cannot be attached to the pipe 100 without compressing or pinching the lower main plate 5 of the clip towards the upper main plate 4. Once the clip 1 is compressed and the cross fitting 101 is attached with the horizontal arms of the cross fitting cradled in the groove 33 of the lower main plate 7. Pressure on the upper and lower main plates 2 and 5 are maintained while the adhesives set. A bottom section of pipe 108 is then attached to the bottom of the cross joint 101, completing the dropline 102. After the welds have set, the compressed clip 1 acts like a spring, maintaining the combination clip 1 and short pipe 100, "T" fitting and "X" fitting as a rigid unitary member, reducing the vibration of dropline 102.

Figure 7:
FIGS. 7A and 7B are side views of embodiments of the improved clip.
Figure 7:
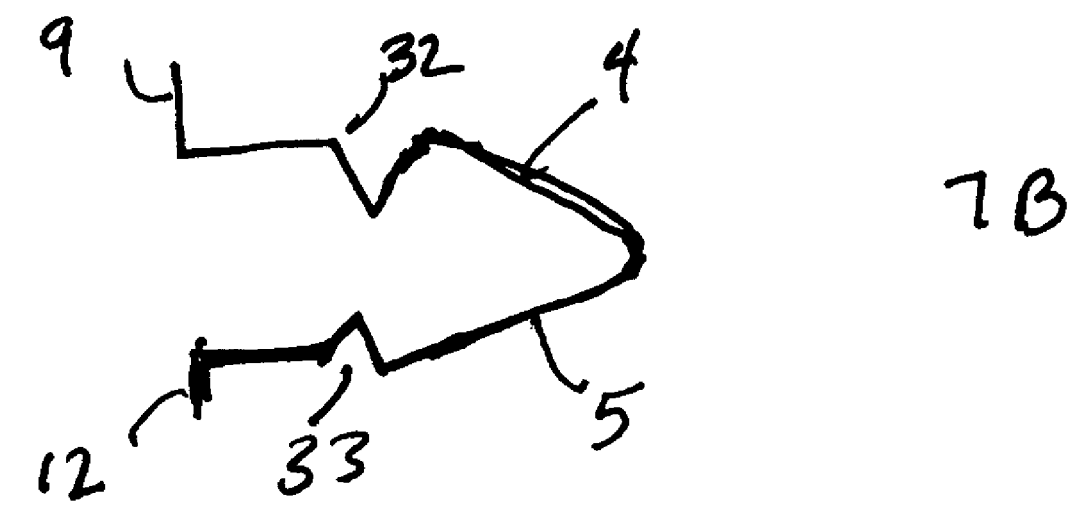

Other embodiments are possible. Instead of dual opposing grooves, the clip can be constructed with a single groove, either located on the top upper main plate or the lower main plate. For instance, if the lower main plate is flat, one suitable dropline fixture would be a flanged body section 108, as shown in FIG. 4. The assembled clip/top dropline is similarly placed under tension to achieve a spring effect. Additionally, the bridging plate 8 may be eliminated. In this instance, the clip would be triangular shaped (upper and lower mounting plates connecting at a vertex); alternatively, the clip could be semi-circular (or oblong) shaped, where the upper main plate, lower main plate and bracing plate are merged into a single structure, as shown in FIGS. 7A and 7B.

Other uses and embodiments of the invention will occur to those skilled in the art, and are intended to be included within the scope and spirit of the following claims.

I claim:

1. An improved aerated wastewater treatment system comprising a tank having a top, a bottom, and tank walls extending therebetween, said system further comprising a clarifier positioned within said tank, said system further having a plurality of substantially vertical droplines extending downwardly into said tank between said clarifier and said tank walls wherein the improvement comprises:

a plurality of clips, each said clip comprising an upper main plate and a lower main plate connected by a bracing plate, said upper main plate having a first groove extending across said upper main plate, said upper and said lower main plates each having openings therethrough, said openings being vertically aligned; and said clips being mounted to said tank walls above the water level in said tank, said droplines extend through said vertically aligned openings in said clips, each of said droplines having a dropline fixture connected to said dropline on the portion of said dropline adjacent to said opening in said lower main plate.

2. The improved aerated wastewater treatment system according to claim 1 wherein said lower main plate has a second groove, said second groove extending across said lower main plate, said first and said second grooves being vertically aligned.

3. The improved aerated wastewater treatment system of claim 1 further having an air distribution manifold, said air distribution manifold supported by said first groove in said upper main plate.

4. The improved aerated wastewater treatment system of claim 1 wherein said first groove is substantially "V" or "U" shaped.

5. The improved aerated wastewater treatment system of claim 2 wherein said second groove is substantially "V" or "U" shaped.

6. An aerated wastewater treatment system according to claim 2 wherein said dropline fixture is a cross pipe joint.

7. An aerated wastewater treatment system according to claim 2 wherein said upper main plate contains a means for receiving tying instruments.

8. An aerated wastewater treatment system according to claim 2 wherein said tank walls have tops; wherein said clip further comprises an upper mounting plate attached to upper mounting plate distal from said bracing plate, said upper mounting plate adapted to attach to said tank walls.

9. An aerated wastewater treatment system according to claim 2 wherein said dropline fixture is a flanged section, said flange being larger than said opening in said lower main plate.

* * * * *